US011958061B2

(12) United States Patent
Metzger et al.

(10) Patent No.: US 11,958,061 B2
(45) Date of Patent: Apr. 16, 2024

(54) ELECTROSTATIC CHARGING AIR CLEANING DEVICE AND COLLECTION ELECTRODE

(71) Applicant: Robert Bosch GmbH, Stuttgart (DE)

(72) Inventors: Michael Metzger, Sunnyvale, CA (US); Saravanan Kuppan, San Jose, CA (US); Sondra Hellstrom, East Palo Alto, CA (US); Nathan Craig, Sunnyvale, CA (US); Christina Johnston, Spanish Fort, AL (US); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/977,324

(22) Filed: Oct. 31, 2022

(65) Prior Publication Data

US 2023/0047164 A1 Feb. 16, 2023

Related U.S. Application Data

(62) Division of application No. 16/229,164, filed on Dec. 21, 2018, now Pat. No. 11,524,304.

(51) Int. Cl.
*B03C 3/47* (2006.01)
*B03C 3/38* (2006.01)
(Continued)

(52) U.S. Cl.
CPC .................. *B03C 3/47* (2013.01); *B03C 3/38* (2013.01); *B03C 3/53* (2013.01); *B03C 3/88* (2013.01)

(58) Field of Classification Search
CPC .... B03C 3/47; B03C 3/38; B03C 3/53; B03C 3/78; B03C 3/74; B03C 3/12; B03C 3/41;
(Continued)

(56) References Cited

U.S. PATENT DOCUMENTS 3,997,304 A * 12/1976 Carr .......................... B03C 3/86 96/90
4,357,150 A * 11/1982 Masuda .................... B03C 3/12 96/58
(Continued)

FOREIGN PATENT DOCUMENTS

KR 10-2017-0036903 A 4/2017

OTHER PUBLICATIONS

Chang et al., Corona Discharge Processes, Invited Review Paper, IEEE Transactions on Plasma Science, vol. 19, No. 6, Dec. 1991, pp. 1152-1166, Canada, 15 pages.
(Continued)

*Primary Examiner* — Christopher P Jones
*Assistant Examiner* — Sonji Turner
(74) *Attorney, Agent, or Firm* — Brooks Kushman P.C.

(57) ABSTRACT

An electrostatic charging air cleaning device. The device includes a pre-charger configured to generate a corona discharge to electrostatically charge particulate matter in an air stream. The device further includes a separator downstream from the pre-charger configured to convey the electrostatically charged particulate matter and formed of an insulative material. The device also includes a collection electrode configured to receive and to absorb the conveyed electrostatically charged particulate matter. The collection electrode includes a substrate material and a coating layer coated onto the substrate material. The coating layer includes a carbon black material and a polymeric binder. The substrate material is a metal plate including mechanical perforations.

14 Claims, 2 Drawing Sheets

(51) Int. Cl.
*B03C 3/53* (2006.01)
*B03C 3/88* (2006.01)

(58) Field of Classification Search
CPC .. B03C 3/60; B03C 3/70; B03C 3/011; B03C 3/017; B03C 3/34
See application file for complete search history.

(56) References Cited

U.S. PATENT DOCUMENTS

| | | | | | |
|---|---|---|---|---|---|
| 4,440,552 | A * | 4/1984 | Uchiya | B03C 3/10 | 96/40 |
| 4,750,921 | A * | 6/1988 | Sugita | B03C 3/155 | 96/67 |
| 4,781,736 | A * | 11/1988 | Cheney | B03C 3/12 | 96/60 |
| 5,290,343 | A * | 3/1994 | Morita | B03C 3/12 | 96/99 |
| 5,368,635 | A * | 11/1994 | Yamamoto | B03C 3/155 | 96/99 |
| 5,438,029 | A * | 8/1995 | Kobata | B03C 3/41 | 502/430 |
| 5,474,600 | A * | 12/1995 | Volodina | B03C 3/38 | 96/99 |
| 5,630,367 | A * | 5/1997 | Kobata | F23G 7/12 | 110/229 |
| 5,647,890 | A * | 7/1997 | Yamamoto | B03C 3/155 | 96/57 |
| 5,855,653 | A * | 1/1999 | Yamamoto | B03C 3/155 | 96/66 |
| 7,160,363 | B2 * | 1/2007 | Kulmala | B03C 3/155 | 96/84 |
| 7,935,380 | B2 * | 5/2011 | Hinoki | H01G 11/86 | 427/79 |
| 8,123,840 | B2 * | 2/2012 | Marra | B03C 3/155 | 95/59 |
| 8,182,580 | B2 * | 5/2012 | Kaukoniemi | B03C 3/60 | 264/DIG. 48 |
| 8,591,601 | B2 * | 11/2013 | Zhong | H01G 11/38 | 29/25.03 |
| 9,101,941 | B2 * | 8/2015 | Kim | C01B 32/378 | |
| 10,707,492 | B2 * | 7/2020 | Amin-Sanayei | H01M 4/623 | |
| 2003/0005824 | A1 * | 1/2003 | Katou | B03C 3/12 | 96/35 |
| 2005/0260118 | A1 * | 11/2005 | Lu | B01D 67/0067 | 423/445 R |
| 2009/0152510 | A1 * | 6/2009 | Ito | H01G 11/38 | 252/511 |
| 2009/0213529 | A1 * | 8/2009 | Gogotsi | H01M 4/96 | 423/445 R |
| 2009/0241777 | A1 * | 10/2009 | Kaukoniemi | B01D 46/0032 | 156/273.1 |
| 2010/0304270 | A1 * | 12/2010 | Amin-Sanayei | H01M 10/052 | 361/528 |
| 2014/0205495 | A1 * | 7/2014 | Ota | A61L 9/22 | 422/4 |
| 2016/0332170 | A1 | 11/2016 | Wennerstrom | | |
| 2019/0126176 | A1 * | 5/2019 | Kaukopaasi | B03C 3/155 | |

OTHER PUBLICATIONS

Zhou et al., Application of digital holographic microscopy and microfluidic chips to the measurement of particle size distribution of fly ash after a wet electrostatic precipitator, Flow Measurement and Instrumentation, pp. 24-29, China, Feb. 13, 2018, 6 pages.

Skalny et al., Mass spectrometric study of negative ions extracted from point to place negative corona discharge in ambient air at atmospheric pressure, International Journal of Mass Spectrometry, pp. 12-21, United Kingdom, Dec. 23, 2007, 10 pages.

Skalny et al., An analysis of mass spectrometric study of negative ions extracted from negative corona discharge in air, International Journal of Mass Spectrometry, pp. 317-324, United Kingdom, Jan. 7, 2004, 8 pages.

Molgaard et al., A New Clean Air Delivery Rate Test Applied to Five Portable Indoor Air Cleaners, Aerosol Science and Technology, pp. 408-417, Finland, Dec. 16, 2013, 10 pages.

Kim et al., A novel electrostatic precipitator-type small air purifier with a carbon fiber ionizer and an activated carbon fiber filter, Journal of Aerosol Science, pp. 63-73, Republic of Korea, Dec. 29, 2017, 11 pages.

Jaworek et al., Two-stage electrostatic precipitators for the reduction of PM2.5 particle emission, Progress in Energy and Combustion Science, pp. 206-233, Poland, Mar. 10, 2018, 28 pages.

Jaworek et al., Two-stage electrostatic precipitator with co- and counter-flow particle prechargers, Journal of Electrostatics, pp. 180-194, Poland, May 4, 2017, 15 pages.

He et al., Correlation of design parameters with performance for electrostatic precipitator. Part II. Design of experiment based on 3D FEM simulation, Applied Mathematical Modelling, 656-669, Singapore, Jul. 6, 2017, 14 pages.

He et al., Correlation of design parameters with performance for electrostatic precipitator. Part I. 3D model development and validation, Applied Mathematical Modelling, 633-655, Singapore, Jun. 1, 2017, 23 pages.

Hamra et al., Outdoor Particulate Matter Exposure and Lung Cancer: A Systematic Review and Meta-Analysis, Environmental Health Perspectives, vol. 122, No. 9, pp. 906-911, Sep. 2014, 8 pages.

* cited by examiner

ELECTROSTATIC CHARGING AIR CLEANING DEVICE AND COLLECTION ELECTRODE

CROSS-REFERENCE TO RELATED APPLICATIONS

This application is a divisional of U.S. application Ser. No. 16/229,164 filed Dec. 21, 2018, now U.S. Pat. No. 11,524,304 which issued on Dec. 13, 2022, the disclosure of which is incorporated in its entirety by reference herein.

TECHNICAL FIELD

The present disclosure relates to an electrostatic charging air cleaning device and collection electrode, and in some embodiments, an electrostatic precipitation (ESP) air cleaning device having a relatively high surface area collection electrode.

BACKGROUND

Non-limiting examples of typical air pollutants are particulate matter (PM) of different sizes, gases, volatile organic compounds (VOCs), bacteria and viruses, and odors. The size of particulate matter is typically measured by particles with x μm diameter (PMx), where x may be 2.5, 5, 10, etc. Examples of pollutant gases include, without limitation, $CO_2$, CO, $NO_x$ and $SO_x$. Examples of VOCs include, without limitation, methane, benzene, ethylene glycol, formaldehyde, methylene chloride, tetrachloroethylene, toluene, xylene, and 1,3-butadiene.

Many conventional technologies have been used for removing pollutants from the air. These technologies include high-efficiency particle arresting (HEPA) filtration, activated carbon filters, air ionizers, and electrostatic precipitators (ESP). Each of these technologies have strengths and weaknesses that make them more or less suitable for certain applications (e.g., indoor versus outdoor cleaning). Some of the characteristics commonly used to measure the performance of air cleaning technologies include clean air delivery rate (CADR) (in units of $m^3/h$), noise level (in dB), and costs per volume of air purified ($\$/m^3$).

HEPA filters are commonly utilized to purify air in homes, office buildings and car interiors. HEPA filters are relatively cost effective and efficient for removing PM with a minimum efficiency of 99.97% removal of PM0.3 and larger. However, HEPA filters have difficulties removing VOCs from air and certain gases, such as $NO_x$ and CO cannot be filtered. Moreover, bio fouling of the filter membranes may cause health risks. Additionally, clogging may lead to frequent filter replacement (about every six (6) months).

SUMMARY

According to one embodiment, an electrostatic charging air cleaning device is disclosed. The device includes a pre-charger configured to generate a corona discharge to electrostatically charge particulate matter in an air stream. The device further includes a separator downstream from the pre-charger configured to convey the electrostatically charged particulate matter and formed of an insulative material. The device also includes a collection electrode configured to receive and to absorb the conveyed electrostatically charged particulate matter. The collection electrode includes a substrate material and a coating layer coated onto the substrate material. The coating layer includes a carbon black material and a polymeric binder. The substrate material is a metal plate including mechanical perforations.

According to another embodiment, a collection electrode for an electrostatic charging air cleaning device is disclosed. The collection electrode includes a substrate material and a coating layer coated onto the substrate material to form a coated substrate material. The coated substrate material includes microstructures.

In yet another embodiment, a method of forming a collection electrode is disclosed. The method includes the step of applying a liquid solution to a current collector material. The liquid solution includes a carbon black material and a liquid solvent. The method further includes evaporating the liquid solvent to deposit the carbon black material on the current collector material to form the collection electrode. The method also includes microstructuring the collection electrode with an external force to form microstructures in the collection electrode.

DETAILED DESCRIPTION

Figure 1:
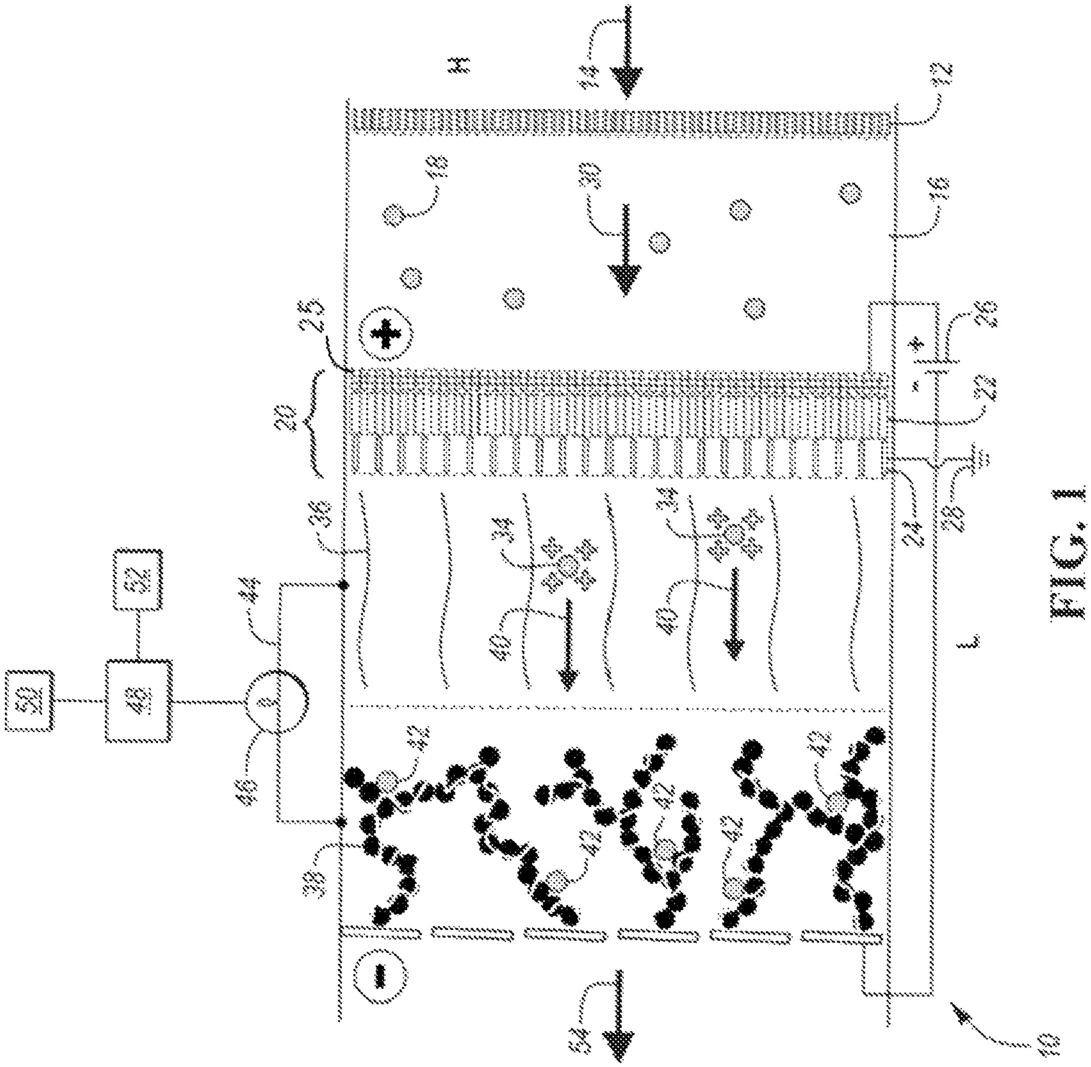
FIG. 1 is a schematic diagram of an electrostatic precipitation (ESP) air filter assembly according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within +0%, 0.1%, 0.5%, 1%, 2%, 3%, 4%, 5% or 10% of the value or relative characteristic.

An emerging technology for air cleaning is electrostatic precipitation (ESP). ESP uses an ionization electrode (for example, one or more wires) to electrostatically charge particle suspended in an airflow. Subsequently, the trajectories of the charged particles are distorted by an induced electric field toward a collection electrode (for example, an electronically conducting collecting plate). The electrostatically adsorbed particles are trapped at the collection electrode, provided that a voltage bias is applied between the ionization electrode and the collection electrode. The trapped, adsorbed particles are consequently removed from the air stream using a collection electrode, for example. The collection electrode is typically a metal plate. The metal plate needs periodic maintenance, e.g., washing the collection electrode, in a frequency similar to filter replacement requirements for HEPA.

In light of the foregoing, what is needed is a high surface area collection electrode for an electrostatic charging air cleaning system, such as an ESP. What is also needed is a method for manufacturing a high surface area collection electrode and an air cleaning device including the high surface area collection electrode.

In one embodiment, a collection electrode of an ESP device may be formed. In a first step, high surface area carbon black powder is dispersed into a liquid solvent. The high surface area carbon black powder may include an electro-conductive carbon black material such as Ketjenblack. The percentage of the electro-conductive carbon black material in the carbon black powder may be one of the following values or within a range of any two of the following values: 60, 65, 70, 75, 80 and 85 percent by weight. The surface area of the carbon black powder may be one of the following values or within a range of any two of the following values: 800, 900, 1,000, 1,100 and 1,200 $m^2/g$ for $N_2$ sorption. The liquid solvent may be n-methyl-2-pyrrolidone (NMP). Other suitable, non-limiting solvents include water, isopropanol (IPA), cyclohexanone ($(CH_2)_5CO$), dimethyl ether (DME) and acetonitrile (MeCN).

In a second step, a polymer binder is added to the carbon black liquid solvent solution to form a carbon black polymer binder slurry. The polymer binder may include a binder material, such as polyvinylidene fluoride (PvDF). Other suitable, non-limiting polymer binder material include polytetrafluoroethylene (PTFE), perfluoroalkoxy (PFA), tetrafluorethylene-perfluoropropylene (FEP), carboxymethyl cellulose (CMC) and styrene-butadiene rubber (SBR). The percentage of binder material in the polymer binder may be one of the following values or within a range of any two of the following values: 15, 20, 25, 30, 35 and 40 percent by weight. In another step, the slurry is tape cast onto a substrate material. Alternatively, an air brush may be utilized to spray the slurry onto the substrate material. The substrate material may be a metal foil or metal mesh material. The metal foil material may be an expanded stainless steel foil. The shape of the apertures formed by the expanding process may be generally rectangular. The nominal size of the apertures of the expanded material may be one of the following values or within a range of any two of the following values: 10 μm, 50 μm, 100 μm, 200 μm and 500 μm. The metal mesh material may be a woven stainless steel mesh. The shape of the apertures formed by the strands of mesh may be generally rectangular or have an irregular shape. The nominal size of the apertures of the woven mesh material may be one of the following values or within a range of any two of the following values: 10 μm, 50 μm, 100 μm, 200 μm and 500 μm. The thickness of the substrate material may be one of the following values or within a range of any two of the following values: 16, 18, 20, 22 and 24 μm. In one or more embodiments, the substrate material is mechanically perforated before being coated with the carbon black liquid solvent solution with the polymeric binder material. The nominal size of the apertures formed by the mechanical perforations may be one of the following values or within a range of any two of the following values: 10 μm, 50 μm, 100 μm, 200 μm and 500 μm.

In the next step according to certain embodiments, the solvent is evaporated from the mixture coated onto the current collector material to obtain a collection electrode. The evaporation step can be performed at an average temperature for a period of time at atmospheric pressure conditions. The average temperature may be one of the following values or within a range of any two of the following values: 70, 80, 90, 100, 110, 120, 130 and 140° C. The period of time may be one of the following values or within a range of any two of the following values: 2, 2.5, 3, 3.5 and 4 hours. The resulting collection electrode may have a porosity of one of the following values or within a range of any two of the following values: 40, 45, 50, 55, 60, 65 and 70 percent. The resulting collection electrode may have a thickness of any one of the following values or within a range of any two of the following values: 200, 250, 300, 350, and 400 μm. The surface area of the resulting collection electrode may be one of the following values or within a range of any two of the following values: 800, 900, 1,000, 1,100 and 1,200 $m^2/g$ for $N_2$ sorption.

In certain embodiments, nano- or micro-sized metallic particles are used instead of high surface area carbon black powder. Non-limiting examples of metallic particles may include alloyed or atomic TiC, Ti, Ag, and Au. The concentration of the metallic particles in the liquid solvent dispersion may be one of the following values or within a range of any two of the following values: 50, 60, 70, 80 and 90 percent.

The resulting collection electrode may be subjected to micro structuring using an external force. Non-limiting examples of external forces are mechanical or thermal. An example of a mechanical external force is perforation with a needle to obtain perforations in the collection electrode. The nominal radius of the perforations may be one of the following values or within a range of any two of the following values: 100 μm, 100 μm, 200 μm, 500 μm and 1 mm. An example of a thermal external force is patterning the collection electrode with a laser beam.

FIG. 1 is a schematic diagram of an electrostatic precipitation (ESP) filter assembly 10 according to an embodiment. In one embodiment, the ESP filter assembly 10 has a rectangular construction. The height and length dimensions of the ESP filter assembly 10 are depicted by the letters H and L on FIG. 1. The width of the ESP filter assembly 10 is coming into and out of the page showing FIG. 1. The height may be any one of the following values or within a range of any two of the following values: 10, 20, 50, 100, 200 and 500 cm. The length may be any one of the following values or within a range of any two of the following values: 5, 7, 10, 20, 30 and 50. The width of the ESP filter assembly 10 may be any one of the following values or within a range of any two of the following values: 10, 20, 50, 100, 200 and 500 cm. The ESP filter assembly 10 may be housed in a housing (not shown), which may be formed of plastic.

ESP filter assembly 10 includes a pre-filter membrane 12. The pre-filter membrane 12 is configured to preclude large particles (e.g., dust particles) in an air stream 14 from entering the ESP filter assembly 10. The size of the large particles may be one of the following values or within a range of any two of the following values: PM100, PM50, PM10, PM5, PM2.5 or very large dust agglomerates. In one embodiment, the pre-filter membrane 12 is formed of a porous polypropylene material. The porosity of the pre-filter membrane may be one of the following values or within a range of any two of the following values: 20, 40, 60 and 80 percent.

After exiting the pre-filter membrane 12, the air stream 14 enters a pre-filter chamber 16. The pre-filter chamber 16 is configured to collect particulate matter within the air stream 14 before it enters pre-charger subassembly 20. The air within pre-filter chamber 16 may include particulate matter of PM2.5 and smaller. The concentration of particulate matter within the pre-filter chamber 16 may be one of the following values or within a range of any two of the following values: 40, 50, 60, 70, 80, 90, 100, 150, 200 and 300 $\mu g/m^3$. The length of pre-filter chamber 16 may be one of the following values or within a range of any two of the following values: 8, 9, 10, 11 and 12 cm. Pre-charger subassembly 20 is configured to electrostatically charge the particulate matter in the pre-filter chamber 16.

Figure 2:
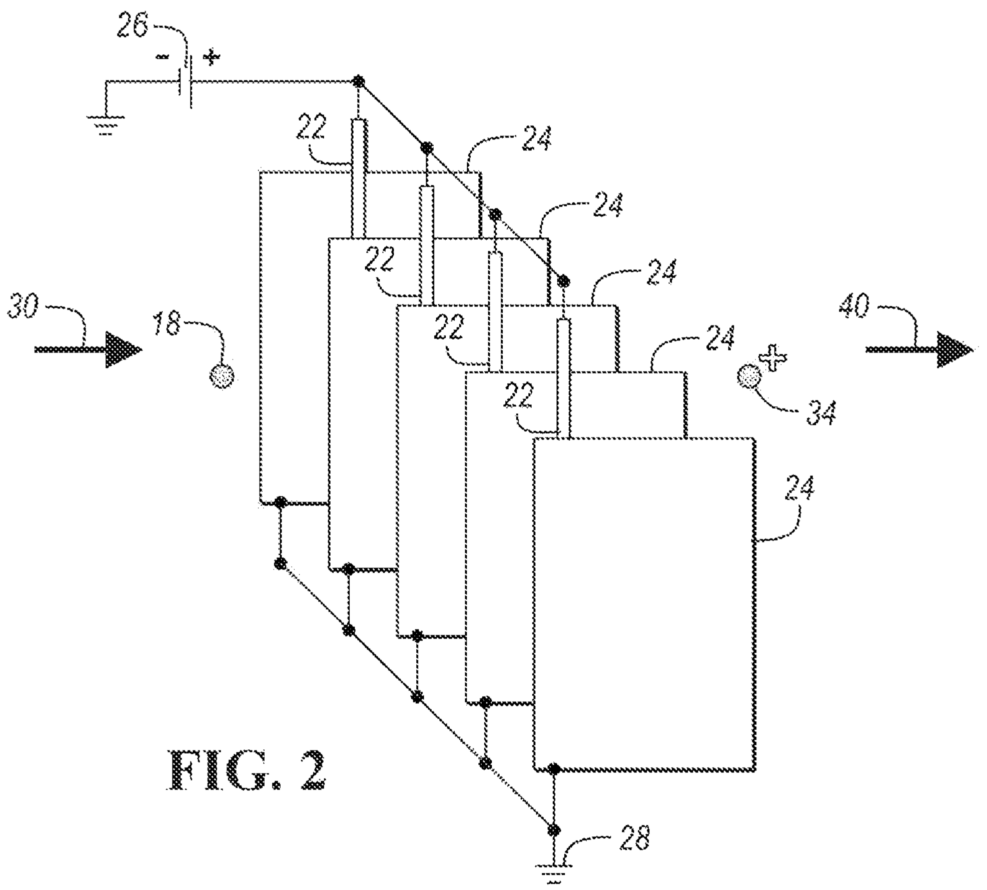
FIG. 2 depicts a perspective view of discharge electrodes dispersed between discharge plates according to an embodiment.

In the embodiment shown in FIG. 1, pre-charger subassembly 20 includes discharge electrodes 22, discharge plates 24, and wiring 25 connected to discharge electrodes 22. FIG. 2 depicts a perspective view of discharge electrodes 22 and discharge plates 24. In one embodiment, as shown in FIG. 2, each discharge electrode 22 is a wire and each discharge plate 24 is a rectangular plate. As shown in FIG. 2, each discharge electrode wire is adjacent to a pair of discharge plates 24. In one embodiment, plates 24 are parallel to each other and are parallel to the axis of the adjacent discharge electrode wire 22, which extends within the space created by the pair of adjacent discharge plates 24 along the axis of the adjacent discharge electrode wire 22 in a direction of the length of each plate 24. Each wire 22 may be equally spaced between the pair of adjacent plates 24. The spacing may be any one of the following values or within a range of any two of the following values: 10 μm, 50 μm, 100 μm, 500μ, 1 mm, 5 mm and 1 cm. As shown in FIGS. 1 and 2, discharge electrodes 22 are connected in parallel to high voltage supply 26. The voltage applied to discharge electrodes 22 may be any one of the following values or within a range of any two of the following values: 1, 2, 5, 10, 20, 50 and 100 kV. As shown in FIGS. 1 and 2, discharge plates 24 are connected to ground 28.

Figure 3:
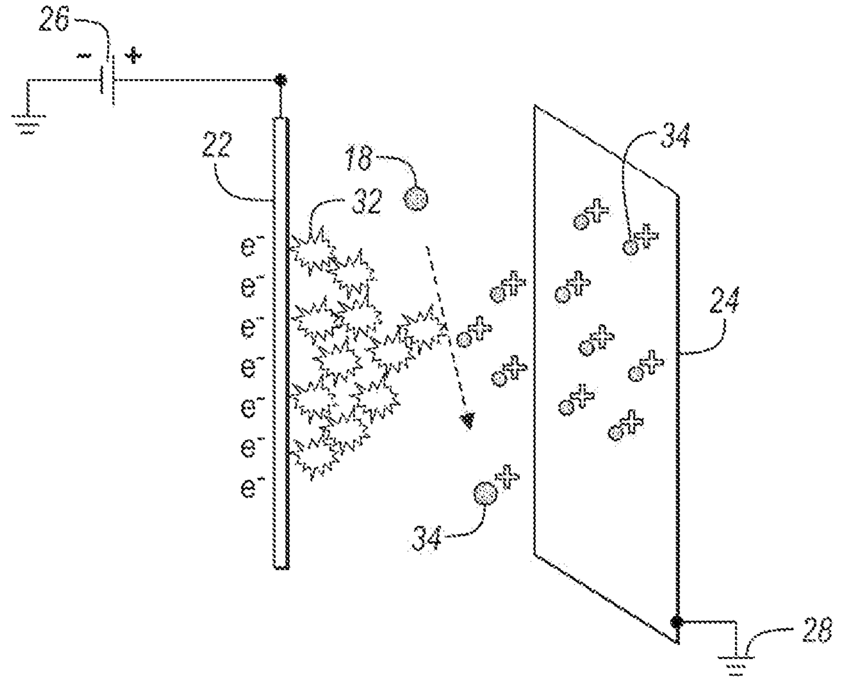
FIG. 3 is a perspective view of a discharge electrode and an adjacent discharge plate according to one embodiment.

As shown by air stream 30, polluted air with particulate matter 18 flows through discharge plates 24. Particulate matter 18 is not charged before entering the space between the discharge plates 24. The velocity of the particulate matter flowing between discharge plates 24 may be one of the following values or within a range of any two of the following values: 0.1, 0.5, 1, 2, 5, 10, 20, 50 and 100 m/s. An electric field between each discharge electrode 22 and pair of adjacent discharge plates creates a corona discharge 32, as shown in FIG. 3. FIG. 3 is a perspective view of a discharge electrode 22 and an adjacent discharge plate 24.

Particulate matter 18 entering pre-charger subassembly 20 is charged by interaction with gaseous ions within the corona discharge 32 to obtain charged particulate matter 34. A separation of charge carriers in the electronic field occurs between a discharge electrode 22 and adjacent discharge plates 24 such that electrons go to the positive electrode (i.e., discharge plates 24) and gaseous ions are repelled.

The length of each of the discharge plates 24 may be relatively short to avoid precipitation of the charged particulate matter 34. The length of the discharge plates 24 may be one of the following values or within a range of any two of the following values: 14, 16, 18, 20 and 22 μm. The length of the discharge electrodes 22 may be one of the following values or within a range of any two of the following values: 14, 16, 18, 20 and 22 μm.

The charged particulate matter 34 exits the pre-charger subassembly 20 and enters a separator 36. Separator 36 is configured to electrically insulate the pre-charger subassembly 20 from collection electrode 38 without impeding the diffusion of pre-charged particulate matter 34 through separator 36. Separator 36 can be formed of a relatively high porosity, insulative material. In one embodiment, separator 36 may be formed from a glass fiber membrane. Other material suitable for use as separator 36 include, without limitation, polypropylene, PTFE and ceramic wool. The length (thickness) of separator 36 may be one of the following values or within a range of any two of the following values: 400, 450, 500, 550 and 600 μm. The porosity of separator 36 may be one of the following values or within a range of any two of the following values: 75, 80, 85, 90 and 95 percent.

As depicted by arrows 40, pre-charged particulate matter 34, which carries one or more positive charges, is accelerated towards collection electrode 38 because it is polarized with a voltage bias opposite pre-charger subassembly 20. As shown in FIG. 1, collection electrode 38 is charged positively and pre-charger subassembly 20 is charged negatively. In one embodiment, upon impact on the surface of the negatively charged collection electrode 38, pre-charged particulate matter 34 loses its static positive charge and becomes neutral particulate matter particles 42. The length (thickness) of collection electrode 38 may be one of the following values or within a range of any two of the following values: 200, 250, 300, 350, and 400 μm. A stream 54 of clean air exits ESP filter assembly 10. The clean air stream 54 does not include the particulate matter particles 42 trapped by collection electrode 38.

Through multiple uses of ESP filter assembly 10, an increasing percentage of the surface of collection electrode 38 is occupied by particulate matter particles 42. Because collection electrode 38 is formed of a relatively high surface area material and has a relatively high porosity as disclosed in one or more embodiments, the use of a single collection electrode 38 can be repeated with a relatively high number of particulate matter particles before collection electrode 38 becomes clogged and needs to be replaced.

As shown in FIG. 1, current flow loop 44 connects separator 36 and collection electrode 38. Current flow sensor 46 is located on current flow loop 44. Current flow sensor 46 is configured to measure the current flow (e.g., amperes (A) over time to calculate charge via Q(C)=I(A)/t(s)) from separator 36 to collection electrode 38. This measured current flow represents the transfer of electrons to particulate matter particles 42 due to the interaction between pre-charged particulate matter 34 and the collection electrode 38. The data from current flow sensor 46 is sent to controller 48, which is configured to receive the current flow data. Controller 48 is further configured to determine a state-of-charge value of collection electrode 48. Controller 48 is further configured to determine the amount of the surface area of collection electrode 48 occupied by adsorbed particles relative to the overall surface area of collection electrode 48. Controller 48 may be configured to output adsorbed particle accumulation data over time. This process, method and algorithm can be used to predict need for maintenance, for instance, collection electrode cleaning or replacement. In one embodiment, controller 48 is in communication with memory 50 and non-volatile storage 52. Memory 50 may be configured to store current flow data. Non-volatile storage 52 may be configured to store look up or correlation tables to covert current flow data into adsorbed particle collection data. Non-volatile storage 52 may be further configured to store adsorbed particle collection data over time.

Controller 48 (or other processor as described herein) may be configured to determine the collection capacity of collection electrode 38. These determinations may use values and functional relationships stored in non-volatile storage 52. The collection capacity of collection electrode 38 can be estimated based on typical concentrations of PM in a polluted air stream. The typical PM concentration is any one of the following values or within a range of any two of the following values: 80, 90, 100, 110 and 120 μg/$m^3$. An average density can be utilized to calculate a PM concentration by volume (e.g., parts per billion (ppm)). For example, if the PM concentration is 100 μg/$m^3$ and the average density is 2 g/$cm^3$, then the PM concentration by volume is 0.05 ppb (100 μg/$m^3$/2 g/$cm^3$). Accordingly, a 600 $ft^2$ apartment contains 20 mg of PM. In one example, the thickness of collection electrode is 200 μm, which results in a collection electrode volume of 0.02 $cm^3$ per $cm^2$ of collection electrode. The void volume in the collection electrode may be one of or within a range of any two of the following values: 30, 40, 50, 60 and 70 percent void volume. The maximum amount of PM occupying the void volume before clogging may be one of or within a range of any two of the following values: 40, 45, 50, 55 and 60 percent. In one example, using a void volume of 50 percent and a maximum amount of PM occupation of 50 percent, the collection capacity may be estimated as 10 mg PM per $cm^2$ of geometric collection electrode area (0.5×0.5×0.02 $cm^3$×2 g/$cm^3$).

An estimation of associated capacity assuming a PM size and single positive charge may be calculated according to a process of one or more embodiments. These estimations can be conducted for any PM size, e.g., PM2.5 particles. In another example, the estimation can be calculated for PM10 particles. The mass of PM10 particle of may be estimated according to the following equation:

$$m = \frac{4}{3}r^3\pi \times 2\frac{g}{c^3} = 10^{-6}\text{ mg} \tag{1}$$

Accordingly, 1 $cm^2$ of collection electrode area is capable of adsorbing n=$10^7$ PM10 particles. The associated capacity assuming a single positive charge is calculated according to the following equation:

$$Q = \frac{nF}{N_A} = 10^{-12}C\text{ per cm}^2\text{ electrode} \tag{2}$$

where n equals the number of particles (here, e.g., $10^7$ PM10 particles), F equals the Faraday constant (96485.3329 C/mol), and NA equals the Avogadro constant (6.02214086× $10^{23}$ $mol^{-1}$).

In another example, ESP air cleaning metrics can be estimated for a device that has an active electrode area of at least 1 $m^2$. The following table identifies several metrics, their calculations and the resulting values for an active electrode area of at least 1 $m^2$.

| Metric | Calculation | Value |
|---|---|---|
| Total mass of PM collected | 10 mg/$cm^2$ × $10^4$ $cm^2$ | 100 g |
| Total particles collected | $10^7$ particles/$cm^2$ × $10^4$ $cm^2$ | $10^{11}$ particles |
| Total capacity (single charges) | $10^{-12}$ C/$cm^2$ × $10^4$ $cm^2$ | $10^{-8}$ C |

In extending this example, a suitable air cleaner may clean the air in a 600 $ft^2$ apartment in 1 hour, which results in a clean air delivery rate (CADR) of 165 $m^3$/h, assuming a 3 m room height. Using a PM pollution level of 100 μg/$m^3$, the PM mass in that air volume would amount to 165 $m^3$×100 μg/$m^3$≈20 mg. Comparing this to an estimated collection capacity of 100 mg, 1 hour of operation at a relatively high pollution level of 100 μg/$m^3$ results in the utilization of 20 mg/100 g=0.02% of the collection capacity. Therefore, ESP filter assembly 10 having a high surface area collection electrode 38 according to one or more embodiments may be operated for 5,000 hours, which is 60% of a year at a continuous (very high) pollution level of 100 μg/$m^3$, without the need for replacement or maintenance. In one or more embodiments, ESP filter assembly 10 having a high surface area collection electrode 38 may operate for 3 to 5 years without maintenance in regions with temporary high pollution levels.

The controller 48 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 50. The memory 50 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 52 may include one or more persistent data storage devices such as a hard drive, optical drive, tape drive, non-volatile solid state device, cloud storage or any other device capable of persistently storing information.

The following application is related to U.S. patent application Ser. No. 16/229,078, filed on Dec. 21, 2018, now U.S. Pat. No. 11,268,711 which issued on Mar. 8, 2022.

The program code embodying the algorithms and/or methodologies described herein is capable of being individually or collectively distributed as a program product in a variety of different forms. The program code may be distributed using a computer readable storage medium having computer readable program instructions thereon for causing a controller or processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer functions than those illustrated consistent with one or more embodiments.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrostatic charging air cleaning device comprising:

a pre-charger configured to generate a corona discharge to electrostatically charge particulate matter in an air stream;

a separator downstream from the pre-charger configured to convey the electrostatically charged particulate matter and formed of an insulative material; and a collection electrode configured to receive and to absorb the conveyed electrostatically charged particulate matter, the collection electrode including a substrate material and a coating layer coated onto the substrate material, and the substrate material is a metal plate including radiused mechanical perforations.

2. The electrostatic charging air cleaning device of claim 1, wherein the radiused mechanical perforations have a nominal aperture size of 10 to 500 μm.

3. The electrostatic charging air cleaning device of claim 1, wherein the collection electrode has a thickness of 200 to 400 μm.

4. The electrostatic charging air cleaning device of claim 1, wherein the collection electrode has a porosity of 40 to 70 percent.

5. The electrostatic charging air cleaning device of claim 1, wherein the polymeric binder includes polyvinylidene fluoride (PvDF), polytetrafluoroethylene (PTFE), perfluoroalkoxy (PFA), tetrafluorethylene-perfluoropropylene (FEP), carboxymethyl cellulose (CMC), styrene-butadiene rubber (SBR), or a combination thereof.

6. The electrostatic charging air cleaning device of claim 1, wherein the polymeric binder includes polyvinylidene fluoride (PvDF).

7. An electrostatic charging air cleaning device comprising:

a pre-charger configured to generate a corona discharge to electrostatically charge particulate matter in an air stream;

a separator downstream from the pre-charger configured to convey the electrostatically charged particulate matter and formed of an insulative material; and a collection electrode configured to receive and to absorb the conveyed electrostatically charged particulate matter, the collection electrode including a substrate material and a coating layer coated onto the substrate material to form a coated substrate material, the coated substrate material including radiused microstructures.

8. The collection electrode of claim 7, wherein the radiused microstructures are mechanical perforations.

9. The collection electrode of claim 8, wherein the radiused mechanical perforations have a nominal aperture size of 10 to 500 μm.

10. The collection electrode of claim 7, wherein the collection electrode has a thickness of 200 to 400 μm.

11. The collection electrode of claim 7, wherein the collection electrode has a porosity of 40 to 70 percent.

12. The collection electrode of claim 7, wherein the substrate material has a thickness of 16 to 24 μm.

13. The collection electrode of claim 7, wherein the substrate material is a metal foil material.

14. The collection electrode of claim 7, wherein the coating layer includes a carbon black material and a polymeric binder.

* * * * *